(12) United States Patent
Sengupta et al.

(10) Patent No.: US 7,430,411 B2
(45) Date of Patent: Sep. 30, 2008

(54) TRANSMISSION OF SERVICE AVAILABILITY INFORMATION

(75) Inventors: Uttam K. Sengupta, Portland, OR (US); Nikhil M. Deshpande, Beaverton, OR (US); Robert Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 10/816,401

(22) Filed: Mar. 31, 2004

(65) Prior Publication Data
US 2005/0221806 A1 Oct. 6, 2005

(51) Int. Cl.
*H04L 29/06* (2006.01)

(52) U.S. Cl. ............... 455/414.3; 455/456.3; 455/458; 455/466; 705/15; 340/286.09; 701/29; 702/181; 379/93.12

(58) Field of Classification Search ............. 455/414.1, 455/414.3, 456.1, 456.3, 404.2, 458, 466; 705/15; 340/286.09, 7.21; 379/93.12; 709/203–206; 701/29; 702/181
See application file for complete search history.

(56) References Cited

U.S. PATENT DOCUMENTS

| | | | |
|---|---|---|---|
| 4,797,818 A * | 1/1989 | Cotter | 705/15 |
| 4,935,720 A * | 6/1990 | Kalfoun | 340/286.09 |
| 5,272,474 A * | 12/1993 | Hilliard | 340/825.29 |
| 5,724,243 A * | 3/1998 | Westerlage et al. | 455/456.5 |
| 5,939,974 A * | 8/1999 | Heagle et al. | 340/286.09 |
| 6,026,372 A * | 2/2000 | Savage | 705/15 |
| 6,091,956 A * | 7/2000 | Hollenberg | 455/456.5 |
| 6,115,611 A * | 9/2000 | Kimoto et al. | 455/456.3 |
| 6,208,866 B1 * | 3/2001 | Rouhollahzadeh et al. | 455/456.5 |
| 6,343,317 B1 * | 1/2002 | Glorikian | 709/218 |
| 6,366,196 B1 * | 4/2002 | Green et al. | 340/286.09 |
| 6,522,875 B1 * | 2/2003 | Dowling et al. | 455/414.3 |
| 6,526,275 B1 * | 2/2003 | Calvert | 455/418 |
| 6,647,257 B2 * | 11/2003 | Owensby | 455/414.1 |
| 6,650,902 B1 * | 11/2003 | Richton | 455/456.3 |
| 6,681,109 B1 * | 1/2004 | Leifer | 455/414.1 |
| 6,785,551 B1 * | 8/2004 | Richard | 455/456.1 |
| 6,799,049 B1 * | 9/2004 | Zellner et al. | 455/456.1 |
| 6,842,719 B1 * | 1/2005 | Fitzpatrick et al. | 702/182 |
| 6,865,261 B1 * | 3/2005 | Rao et al. | 379/93.12 |
| 6,895,238 B2 * | 5/2005 | Newell et al. | 455/414.2 |
| 7,010,267 B2 * | 3/2006 | Vanluijt et al. | 455/41.2 |
| 7,035,731 B2 * | 4/2006 | Smith | 701/207 |
| 7,062,281 B2 * | 6/2006 | Blink et al. | 455/458 |
| 7,343,174 B2 * | 3/2008 | Suryanarayana et al. | 455/553.1 |
| 2002/0022488 A1 * | 2/2002 | Srinivasan et al. | 455/456 |
| 2002/0095312 A1 * | 7/2002 | Wheat | 705/1 |
| 2003/0171126 A1 * | 9/2003 | Blink et al. | 455/458 |
| 2003/0213840 A1 * | 11/2003 | Livingston et al. | 235/375 |
| 2003/0220835 A1 * | 11/2003 | Barnes, Jr. | 705/14 |
| 2005/0080675 A1 * | 4/2005 | Lovegreen et al. | 705/15 |

* cited by examiner

*Primary Examiner*—Sharad Rampuria
(74) *Attorney, Agent, or Firm*—Blakely, Sokoloff, Taylor & Zafman LLP

(57) ABSTRACT

Methods and apparatuses for providing service availability information to a waiting customer using the customer's wireless device are generally introduced herein.

15 Claims, 5 Drawing Sheets

TRANSMISSION OF SERVICE AVAILABILITY INFORMATION

TECHNICAL FIELD

Embodiments of the invention relate to communication of service (e.g., restaurant, hair dresser) information to a waiting customer and improving provision of service by a service provider. More particularly, embodiments of the invention relate to providing information (e.g., scheduling information) related to service availability to a waiting/potential customer using wireless communication.

BACKGROUND

When attempting to obtain services from a service establishment that allows customers to obtain services without a reservation/appointment (e.g., a restaurant, a hair dresser, a mechanic), a potential customer can be informed that a significant waiting period will be required before the customer can receive the desired services. If the customer wishes to wait to obtain the services, the customer then adds his/her name to a waiting list and determines what to do during the waiting period.

Some establishments provide basic wireless devices that notify a customer that the desired services are available. However, these wireless devices suffer from multiple disadvantages. For example, these wireless devices are single purpose and are typically large with limited range. That is, a customer is required stay within a close proximity of the establishment and carry a large wireless device. This can have a detrimental effect on a customer's experience with the establishment.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The techniques and devices described herein that may provide service availability information to a waiting customer using a wireless device to benefit both the customer and to the service establishment. The benefits to the waiting customer may include, for example, a wider selection of activities that are available during the waiting period, greater information regarding the availability of services and/or the ability to reschedule services. The benefits to the service establishment may include, for example, increased efficiency in providing limited services, increased customer satisfaction and/or increased opportunities for word of mouth advertising from the waiting customer.

Figure 1:
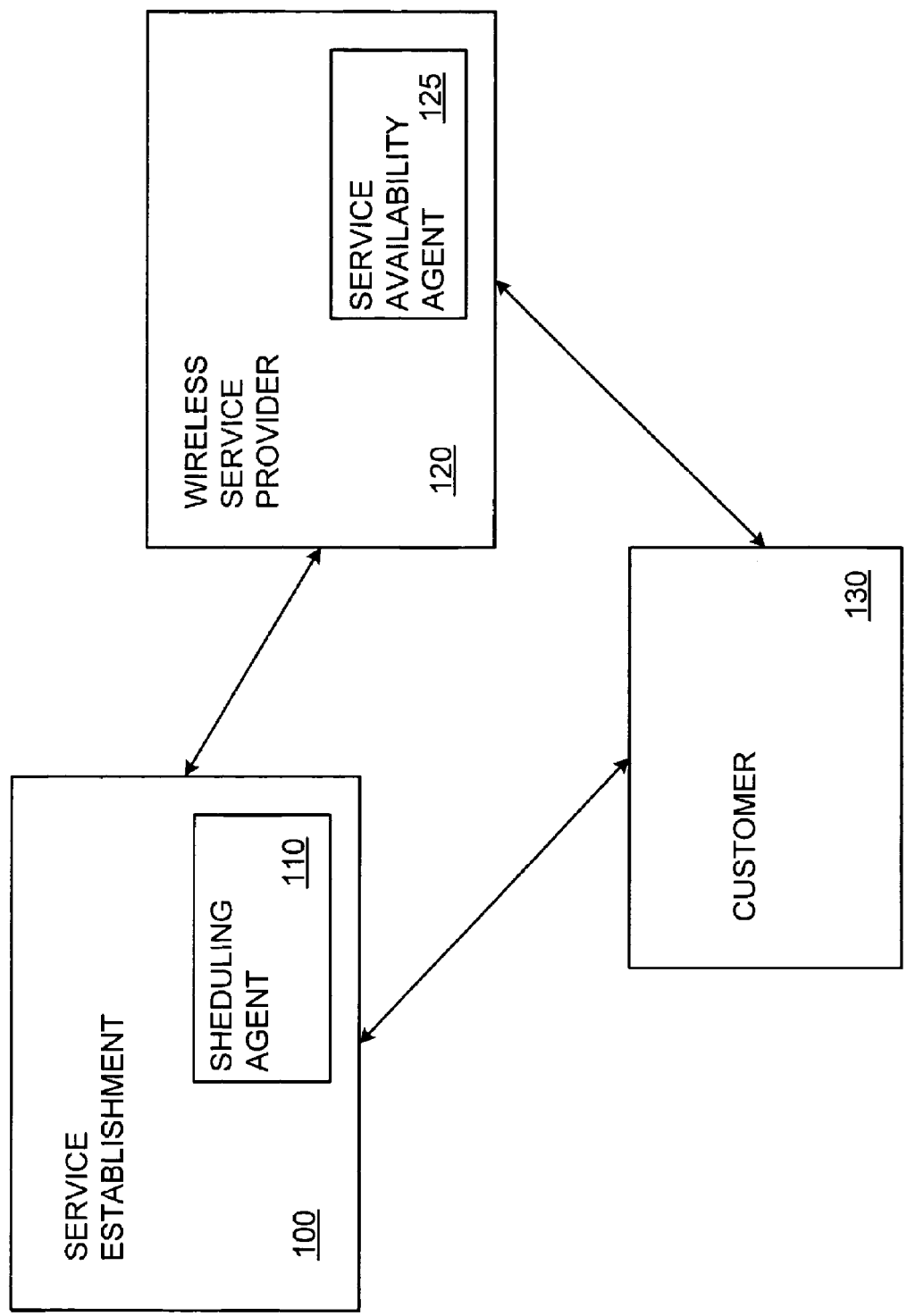
FIG. 1 is a high-level diagram of one embodiment of an architecture for providing improved service availability information using wireless devices.

FIG. 1 is a high-level diagram of one embodiment of an example architecture for providing improved service availability information using multi-purpose wireless devices. Service establishment 100 may be any type of establishment that provides goods and/or services to a customer without requiring reservations for all customers. Service establishment 100 may be, for example, a restaurant, a hair salon, an automobile service facility, an amusement park (or individual attractions within the amusement park), a spa, a bar, a club, a golf course, a bowling facility, a tennis court, a Las Vegas wedding hall, etc.

In one embodiment, service establishment 100 may have an electronic scheduling capability (hereinafter "scheduling agent 110"), for example, seating and scheduling software for a restaurant. As described in greater detail below, scheduling agent 110 may be any combination of hardware and software. In one embodiment, scheduling agent 110 may communicate with wireless service provider 120 to provide scheduling information for service establishment 110 that can be selectively transmitted to customer 130 by wireless service provider 120. In an alternate embodiment, service establishment 100 may communicate with customer 130 using wireless protocols.

Wireless service provider 120 may be, for example, a cellular telephone service provider, a paging service provider, or a wireless Internet service provider. Wireless service provider 120 receives scheduling information from scheduling agent 110 and uses the received scheduling information to provide service availability information to a wireless device belonging to, or carried by, customer 130.

In one embodiment, customer 130 may receive service availability information from wireless service provider 120 using any wireless device capable of receiving various types of information, for example, a cellular telephone, a pager, a personal digital assistant (PDA), a portable computer, a global positioning system (GPS) device, a watch, a wireless electronic mail device, etc. Any wireless communication protocol known in the art can be used to communicate information from wireless service provider 120 and the wireless device corresponding to customer 130.

While the architecture of FIG. 1 is described in terms of a service establishment providing service availability information to a wireless service provider for informing the customer, alternate architectures without wireless service providers can also be used. For example, the service establishment may have the ability to communicate directly with the wireless device using the same protocol as the wireless service provider, or the service establishment and the wireless device can communicate using a protocol other than the protocol used by the wireless service provider.

Figure 2:
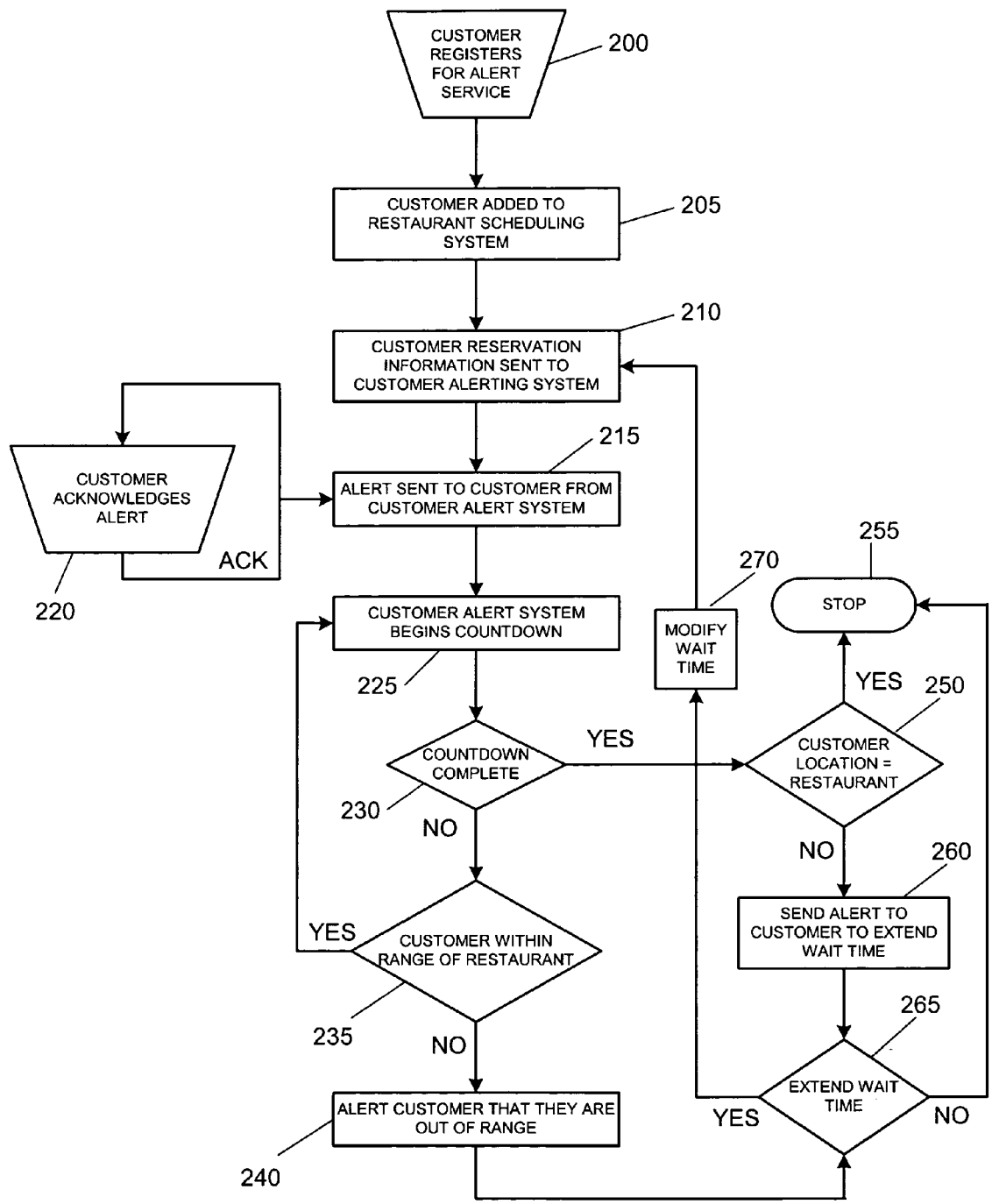
FIG. 2 is a flow diagram of one embodiment of a technique for providing service availability information to a customer via a wireless device.

FIG. 2 is a flow diagram of one embodiment of a technique for providing service availability information to a customer via a wireless device. The example of FIG. 2 includes optional features that desirable for certain embodiments of the invention, but are not necessary or are optional for other embodiments of the invention. Also, the example of FIG. 2 is provided in terms of a customer waiting for a table at a restaurant; however, as described above, the techniques and devices described herein are applicable to a broad range of service establishments including, but not limited to, restaurants.

A customer having a wireless device may initially register for alert services, 200. According to one example embodiment, such registration need not require any particular action on behalf of the user, but may be automatic or inherent in a service agreement, for example. As described in greater detail below, the alert services may also include a tracking service. The alert service can be provided, for example, by a wireless service provider as part of a wireless communications service. Registration may occur any time before use of the alert services. That is, a user may register for alert services when purchasing a cellular telephone, or a user may register for alert services shortly before entering a restaurant providing service availability information, or at any other time.

The customer may be added to a restaurant scheduling system, 205, e.g., as a result of such prior registration. In one embodiment, in order to be added to the restaurant scheduling system, the customer may provide a wireless device identifier (e.g., a cellular telephone number, a wireless PDA identifier, a wireless network address, an electronic mail address, a pager number), a number of people in the party, and seating preferences (e.g., smoking/non-smoking, table/booth). In one embodiment, the wireless device identifier is provided by the wireless device and not by the customer. In alternate embodiments, the wireless device identifier is provided by the customer. Other and/or different information can be provided when a customer is added to the scheduling system.

The customer may not be required to be present at the restaurant when providing information to the restaurant. For example, a customer may call a restaurant, for example, using a cellular telephone and be added to the scheduling system as a waiting customer. Service availability information can then be provided to the customer via the cellular telephone.

The customer reservation information may be sent to the customer alerting system, 210. The customer alerting system can then provide service availability information to the customer using the wireless device registered for alerting services. In one embodiment, the customer reservation information may include the wireless device identifier, an estimated wait time and location coordinates of the restaurant, although the scope of the invention is not limited in this regard. Other and/or different information can be included in the customer reservation information.

In one embodiment, an alert may be sent to the customer's wireless device from the alerting system, 215. This initial alert is optional and allows the alerting system to notify the customer that the reservation request has been entered and is active in the customer alerting system. The initial alert may be used to provide information related to the information request, for example, restaurant name, party size, or other information as well as provide an indication of the estimated wait time. The initial alert may also allow the customer to select additional services and/or features, for example, a tracking and/or travel directory service can be provided to the customer.

In one embodiment, the customer may acknowledge the initial alert, 220. The acknowledgement may also include a request for additional and/or optional features, for example, a tracking service. In one embodiment, the acknowledgment may enable the customer alerting services. The acknowledgment may also allow the customer alerting system to determine whether the customer's wireless device is functioning properly.

In one embodiment, the customer alerting system may begin a countdown based on the estimated wait time provided by the restaurant scheduling system, 225. If the tracking option has been enabled, the customer alerting system may also track the location of the customer's wireless device. Tracking may be accomplished using any type of location-aware technology, for example, GPS, triangulation techniques, directional transmission, etc.

If the tracking option has not been enabled, the customer alerting system may alert the customer, via the wireless device, that the estimated wait time has elapsed. In alternate embodiments, the customer alerting system may provide alerts prior to expiration of the estimated wait time (e.g., a five minute warning). In another alternate embodiment, the restaurant scheduling system may periodically update the estimated customer wait time provided to the customer alerting system based on conditions at the restaurant, which may be factored into alerts provided to the customer's wireless device.

If the tracking option has been enabled, the customer alerting system may determine the location of the customer's wireless device during the estimated waiting period to determine whether the customer is within range of the restaurant, 235. In one embodiment, the customer alerting system may factor in travel conditions such as speed and traffic conditions to determine whether the customer is within range of the restaurant. For example, if an estimated wait time is 30 minutes and the customer has driven away from the restaurant for 15 minutes, the customer alerting system can alert the customer that they may not be able to return to the restaurant at the appointed time, 240.

The restaurant may also be provided with location information related to waiting customers. For example, the restaurant may be notified when a waiting customer is not within close range of the restaurant. This may allow the restaurant to, for example, extend the customer's wait time (or change his appointment time) with or without consulting with the waiting customer, or it may allow the restaurant to notify subsequent potential customers that a table may be available sooner than their previously-assigned wait time. With sufficient tracking ability, the restaurant can estimate when a customer in motion will arrive, and modify his and others' wait times accordingly.

Various techniques may be used for determining travel conditions including, for example, periodic GPS or triangulation determinations of location, monitoring of traffic flow in various locations, etc. If a customer is going out of proximity to the restaurant, the customer may be provided with the option to extend the wait time in order to not lose their place in the restaurant queue. If this option is selected, the wait time may be modified, 270 and updated information may be provided to the customer alerting system and/or restaurant scheduling system.

If, when the countdown is complete, 230, the customer is at the restaurant location, 250, the customer may be notified that they have reached the head of the queue and monitoring can be stopped 255. If, when the countdown is complete, 230, and the customer is not at the restaurant location, 250, the customer may be given the option of extending the wait time, 260.

If the customer opts to extend the wait time, 260, the wait time may be modified (265, 270) by the customer alerting system and/or restaurant scheduling system. In one embodiment, if the customer declines extending the wait time, 260, the customer effectively ends the alert service and the alert and/or monitoring service is stopped, 255. The customer may also be provided the opportunity to extend the wait time if an unanticipated delay is encountered. For example, if the waiting customer experiences automobile troubles, the wait time can be extended while the customer waits for a tow truck. In one embodiment, if the restaurant is notified or can determine that no table will be available at the scheduled time, the customer can be notified of a delay.

If the customer opts to extend the wait time, the restaurant can offer the customer's table to another waiting customer. This communication between the waiting customer and the restaurant may allow the restaurant to provide limited service resources in a more efficient manner, which can result in benefits to the restaurant including, for example, increased customer satisfaction and increased revenue.

Figure 3:
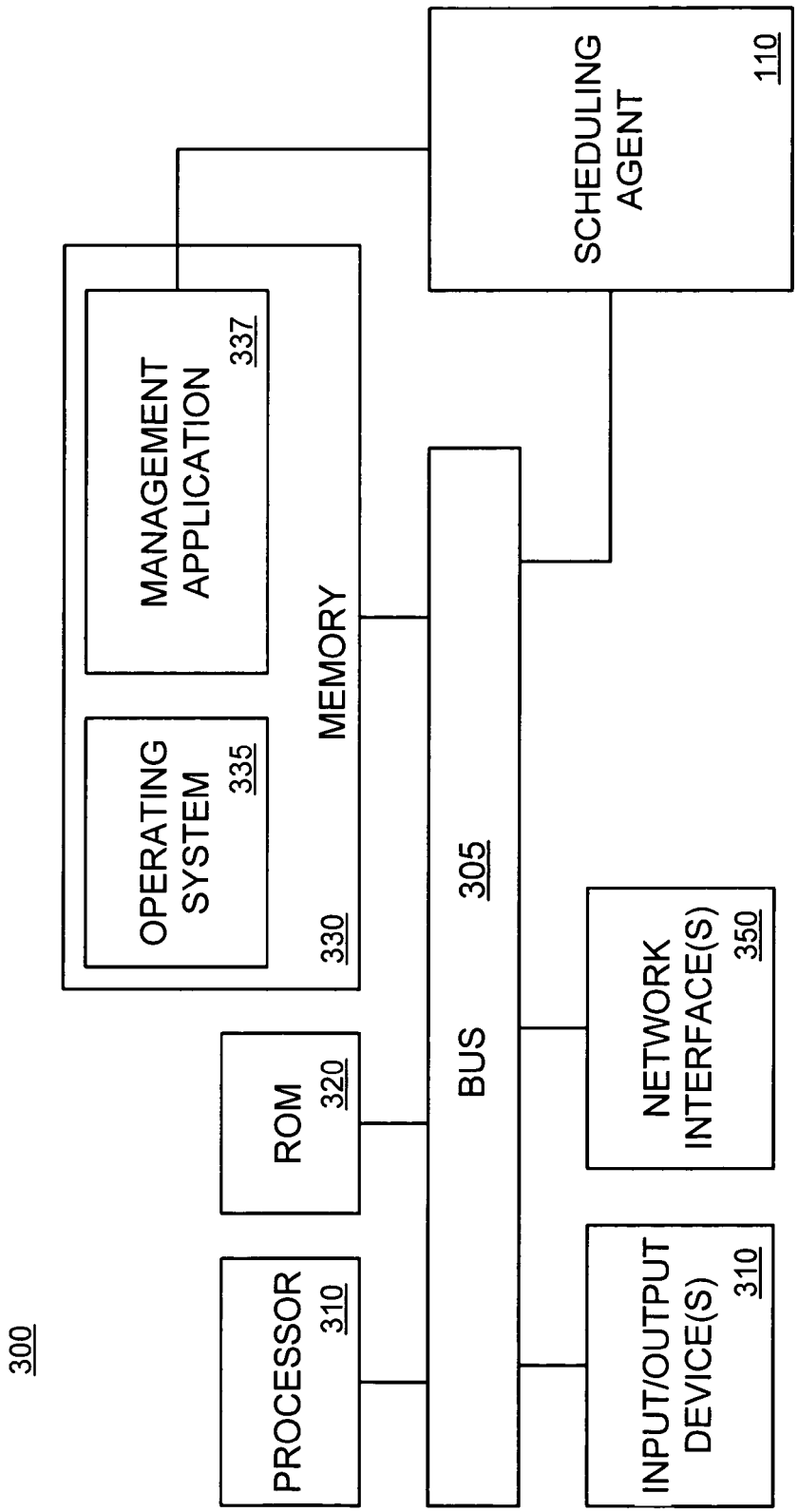
FIG. 3 is a block diagram of one embodiment of an electronic system having a scheduling agent that can be used by a service establishment to provide service availability information to a customer via a wireless device.

FIG. 3 is a block diagram of one embodiment of an electronic system having a scheduling agent that can be used by a service establishment to provide service availability information to a customer via a wireless device. The electronic system illustrated in FIG. 3 is intended to represent a range of electronic systems including, for example, computer systems. Alternative electronic systems can include more, fewer and/or different components.

The electronic system of FIG. 3 can be, for example, a computer system in a restaurant that is used for table scheduling or other restaurant management purposes. In other types of service establishments (i.e., other than restaurants), the electronic system and scheduling agent can provide other scheduling and/or management functionality specific to the type of service establishment in which the system may be used.

Electronic system 300 includes bus 305 or other communication device to communicate information, and processor 310 coupled to bus 305 to process information. While electronic system 300 is illustrated with a single processor, electronic system 300 can include multiple processors and/or co-processors. Electronic system 300 further includes read-only memory (ROM) or other static storage device 320, coupled to bus 300.

Electronic system 300 further includes input/output (I/O) device(s) 340 for receiving input data and/or signals and for providing output signals. I/O device(s) 340 can include, for example, a keyboard, a mouse, a touch screen, a liquid crystal display, a cathode ray tube, a wireless interface, or any other type of I/O device known in the art. Network interface(s) 350 provides an interface to one or more networks (not shown in FIG. 3) that are external to electronic system 300. Network interface(s) 350 can be, for example, an Ethernet interface, a wireless local area network interface, etc.

Electronic system 300 also includes memory 330 coupled with bus 305. Memory 330 can include any combination of random access memory (RAM), including one or more cache memories, and static memory, for example, a hard disk drive, a flash memory device, etc. In one embodiment, memory 330 stores operating system 335, which provides system level software to be executed by processor 310 to control electronic system 300. Operating system 335 can be any operating system known in the art or an application-specific operating system.

Memory 330 further includes management application 337 which interacts with one or more components of electronic system 300 to provide functionality for a service establishment. For example, if the service establishment is a restaurant, management application 337 can provide functionality for tracking tables, customers, wait staff, kitchen inventories, gross revenue, hourly profit/loss, etc. In one embodiment, management application 337 maintains a list of waiting customers and either stores or generates an estimated wait time for the waiting customers.

Electronic system 300 further includes scheduling agent 110 that can be any combination of software stored in memory 330 and/or hardware coupled with bus 305 or other component of electronic system 300. Scheduling agent 110 operates as described above to provide service availability information related to waiting customers. In one embodiment, scheduling agent 110 operates using network interface 350 to provide scheduling information to a remote wireless service provider. In an alternate embodiment, scheduling agent 110 includes a dedicated interface (e.g., a wireless network interface) to provide scheduling information to the remote wireless service provider.

Figure 4:
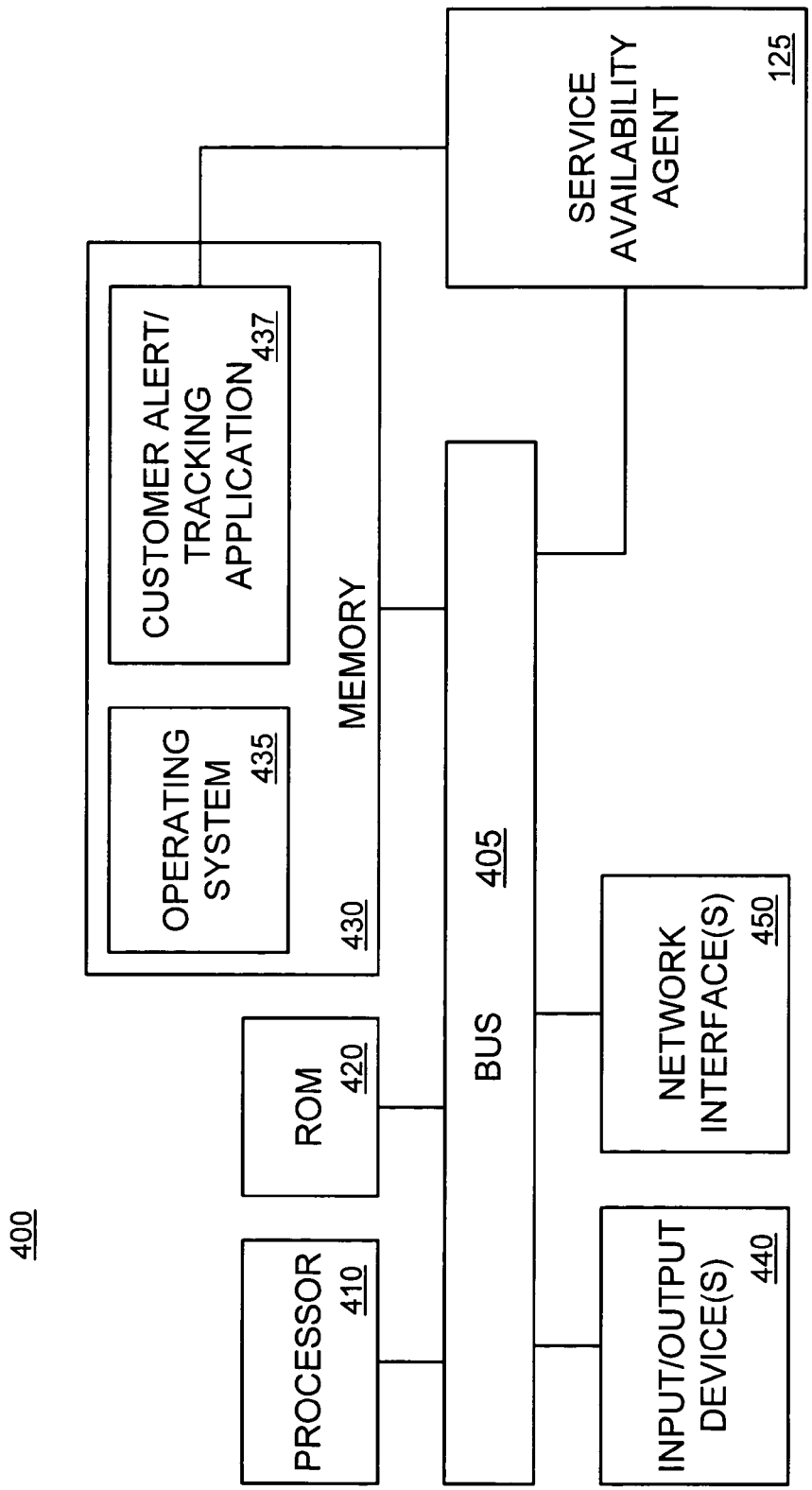
FIG. 4 is a block diagram of one embodiment of an electronic system having a service availability agent that can be used by a service establishment to provide service availability information to a customer via a wireless device.

FIG. 4 is a block diagram of one embodiment of an electronic system having a service availability agent that can be used by a service establishment to provide service availability information to a customer via a wireless device. The electronic system illustrated in FIG. 4 is intended to represent a range of electronic systems including, for example, computer systems. Alternative electronic systems can include more, fewer and/or different components.

In one embodiment, electronic system 400 is located a wireless service provider facility. The electronic system of FIG. 4 can be, for example, a computer system in a network node of the wireless service provider that processes information received from a service establishment for forwarding and/or otherwise communicating with the wireless device corresponding to the waiting customer.

Electronic system 400 includes bus 405 or other communication device to communicate information, and processor 410 coupled to bus 405 to process information. While electronic system 400 is illustrated with a single processor, electronic system 400 can include multiple processors and/or co-processors. Electronic system 400 further includes read-only memory (ROM) or other static storage device 420, coupled to bus 400.

Electronic system 400 further includes input/output (I/O) device(s) 440 for receiving input data and/or signals and for providing output signals. I/O device(s) 440 can include, for example, a keyboard, a mouse, a touch screen, a liquid crystal display, a cathode ray tube, a wireless interface, or any other type of I/O device known in the art. Network interface(s) 450 provides an interface to one or more networks (not shown in FIG. 4) that are external to electronic system 400. Network interface(s) 450 can be, for example, an Ethernet interface, or a wireless local area network interface.

Electronic system 400 also includes memory 430 coupled with bus 405. Memory 430 can include any combination of random access memory (RAM), including one or more cache memories, and static memory, for example, a hard disk drive, a flash memory device, etc. In one embodiment, memory 430 stores operating system 435, which provides system level software to be executed by processor 410 to control electronic system 400. Operating system 435 can be any operating system known in the art or an application specific operating system.

Memory 430 further includes customer alert/tracking application 437 which interacts with one or more components of electronic system 400 to provide functionality for a wireless service provider. For example, if the wireless service provider is a cellular telephone service provider, customer alert/tracking application 437 can provide functionality for tracking customer location, providing an indication of estimated wait time, estimating travel time, etc.

Electronic system 400 further includes service availability agent 125 that can be any combination of software stored in memory 430 and/or hardware coupled with bus 405. Service availability agent 125 operates as described above to provide service availability information related to waiting customers. In one embodiment, service availability agent 125 operates using network interface 450 to receive scheduling information to a remote service establishment. In an alternate embodiment, scheduling agent 110 includes a dedicated interface (e.g., a wireless network interface) to provide scheduling information to the remote wireless service provider.

Figure 5:
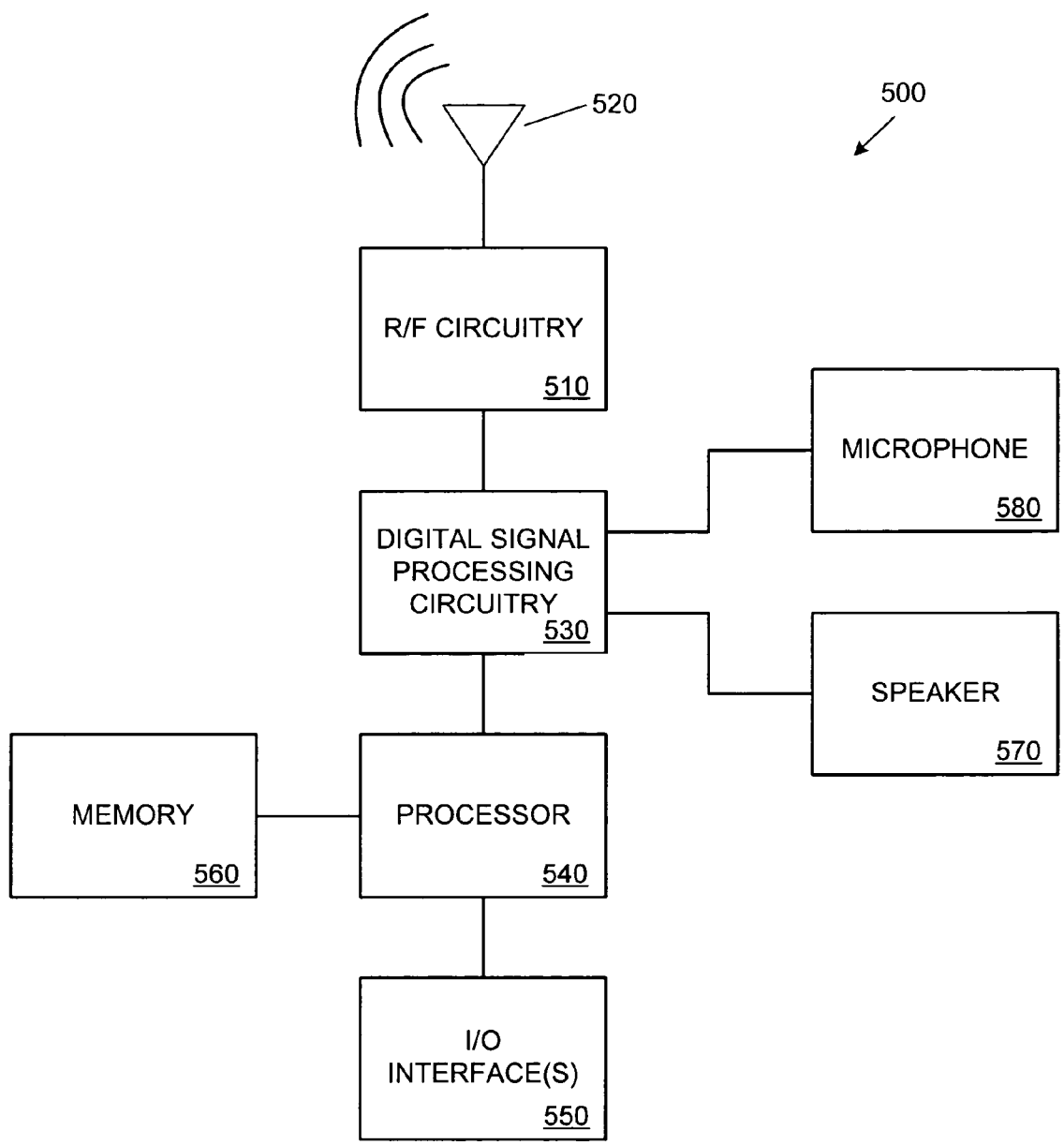
FIG. 5 is a block diagram of one embodiment of a wireless device.

FIG. 5 is a block diagram of one embodiment of a wireless device. Wireless device 500 may be any type of wireless device that allows a user to communicate with a remote device using wireless protocols. For example, wireless device 500 can be a cellular telephone, a cellular-enabled personal digital assistant, a cellular-enabled automobile, etc.

In one embodiment, wireless device 500 may include processor 540 that provides processing functionality to support operation of the wireless device. Processor 540 may be coupled with input/output (I/O) interface(s) 550 that allow a user of wireless device 500 to provide and receive information. For example, I/O interface(s) 550 may be coupled with a keypad and/or a display device. Processor 540 may also be coupled with memory 560, which can include dynamic, static, flash and/or any other type of memory. Memory 560 can provide storage for instructions executed by processor 540 as well as data.

In one embodiment, processor 540 may be coupled with digital signal processor (DSP) circuitry 530. DSP circuitry 530 can be any type of DSP circuitry known in the art. DSP circuitry 530 may be coupled with speaker 570 and microphone 580 that may be used in transmitting of voice communications DSP circuitry 530 may be coupled with radio frequency (R/F) circuitry 510 that may be used in receiving and transmitting radio frequency signals using antenna 520, which can be any type of antenna known in the art, for example, one or more omnidirectional antenna(e).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving customer information corresponding to a customer-provided wireless device from a party including one or more customers requesting services from a service establishment that provides services to customers within the service establishment;
   generating service availability information corresponding to at least an estimated time until the requested services are available in response to receiving the customer information wherein the service availability information comprises one or more of an estimated wait time, a distance between the service establishment and the wireless device, a service status, a location of the service establishment and a location of the wireless device;
   monitoring the distance between the service establishment and the wireless device to determine whether an estimated travel time over the distance exceeds the estimated wait time; and
   providing, to a wireless service provider that provides wireless services to the customer-provided wireless device, the service availability information including providing a notification via the wireless device when the estimated travel time exceeds the estimated wait time.

2. The method of claim 1 wherein the wireless device comprises one of: a cellular telephone, a pager, a personal digital assistant (PDA), a portable computer, a global positioning system (GPS) device, a watch, and a wireless electronic mail device.

3. The method of claim 1 wherein the service establishment comprises one of: a restaurant, a hair salon, an automobile service facility, an amusement park attraction, a spa, a bar, a club, a golf course and a bowling facility.

4. The method of claim 1 wherein the customer information comprises one or more of: a number of people in the party, a service preference and a wireless identifier.

5. The method of claim 4 wherein the wireless identifier comprises one of: a cellular telephone number, a pager number, a wireless device network address, a user identifier, a group identifier.

6. An article comprising a computer-readable medium having stored thereon instructions that, when executed, cause one or more processors to:
   receive customer information corresponding to a customer-provided wireless device from a party including one or more customers requesting services from a service establishment that provides services to customers within the service establishment;
   generate service availability information corresponding to at least an estimated time until the requested services are available in response to receiving the customer information wherein the service availability information comprises one or more of an estimated wait time, a distance between the service establishment and the wireless device, a service status, a location of the service establishment and a location of the wireless device;
   monitor the distance between the service establishment and the wireless device to determine whether an estimated travel time over the distance exceeds the estimated wait time; and
   provide, to a wireless service provider that provides wireless services to the customer-provided wireless device, the service availability information including providing a notification via the wireless device when the estimated travel time exceeds the estimated wait time.

7. The article of claim 6 wherein the wireless device comprises one of: a cellular telephone, a pager, a personal digital assistant (PDA), a portable computer, a global positioning system (GPS) device, a watch, and a wireless electronic mail device.

8. The article of claim 6 wherein the service establishment comprises one of: a restaurant, a hair salon, an automobile service facility, an amusement park attraction, a spa, a bar, a club, a golf course and a bowling facility.

9. The article of claim 6 wherein the customer information comprises one or more of: a number of people in the party, a service preference and a wireless identifier.

10. The article of claim 9 wherein the wireless identifier comprises one of: a cellular telephone number, a pager number, a wireless device network address.

11. A system comprising:
    a memory controller;
    a device for accessing a computer-readable medium coupled with the memory controller; and
    an article comprising a computer-readable medium having stored thereon instructions that, when executed, cause one or more processors to receive customer information corresponding to a customer-provided wireless device from a party including one or more customers requesting services from a service establishment that provides services to customers within the service establishment, generate service availability information corresponding to at least an estimated time until the requested services are available in response to receiving the customer information, wherein the service availability information comprises one or more of an estimated wait time, a distance between the service establishment and the wireless device, a service status, a location of the service establishment and a location of the wireless device, monitor the distance between the service establishment and the wireless device to determine whether an estimated travel time over the distance exceeds the estimated wait time, and provide, to a wireless service provider that provides wireless services to the customer-provided wireless device, the service availability information including providing a notification via the wireless device when the estimated travel time exceeds the estimated wait time.

12. The system of claim 11 wherein the wireless device comprises one of: a cellular telephone, a pager, a personal digital assistant (PDA), a portable computer, a global positioning system (GPS) device, a watch, and a wireless electronic mail device.

13. The system of claim 11 wherein the service establishment comprises one of: a restaurant, a hair salon, an automobile service facility, an amusement park attraction, a spa, a bar, a club, a golf course and a bowling facility.

14. The system of claim 11 wherein the customer information comprises one or more of: a number of people in the party, a service preference and a wireless identifier.

15. The system of claim 14 wherein the wireless identifier comprises one of: a cellular telephone number, a pager number, a wireless device network address.

* * * * *